United States Patent [19]

Houze et al.

[11] Patent Number: 4,503,175

[45] Date of Patent: Mar. 5, 1985

[54] ACRYLIC POLYURETHANE COATING COMPOSITION

[75] Inventors: Eric C. Houze, Royal Oak, Mich.; Joseph A. Vasta, Wilmington, Del.

[73] Assignee: E. I. Du Pont de Nemours and Company, Wilmington, Del.

[21] Appl. No.: 562,815

[22] Filed: Dec. 19, 1983

[51] Int. Cl.³ .................... C08G 18/62; C08G 18/79
[52] U.S. Cl. ........................... 524/39; 524/91; 524/102; 524/140; 524/558; 525/123
[58] Field of Search ............. 524/507, 558, 39, 91, 524/102, 140; 525/123; 528/73

[56] References Cited

U.S. PATENT DOCUMENTS

| | | | |
|---|---|---|---|
| 3,558,564 | 1/1971 | Vasta | 524/507 |
| 4,131,571 | 12/1978 | Crawley | 524/40 |
| 4,289,813 | 9/1981 | Blomeyer | 525/123 |
| 4,324,879 | 4/1982 | Bock | 528/73 |

FOREIGN PATENT DOCUMENTS

| | | | |
|---|---|---|---|
| 0029598 | 6/1981 | European Pat. Off. | 525/123 |
| 2065960 | 8/1977 | Fed. Rep. of Germany | 525/123 |

*Primary Examiner*—C. Warren Ivy
*Attorney, Agent, or Firm*—Hilmar L. Fricke

[57] ABSTRACT

A coating composition in which the binder contains the following:
(1) an acrylic polymer having pendent hydroxyl containing ester groups and
(2) a polyisocyanate which has the formula

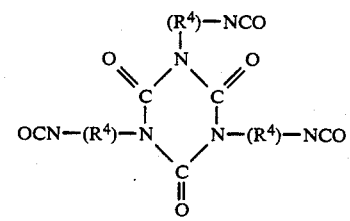

where $R^4$ is a hydrocarbon group having 6 carbon atoms.

The composition can be used as an unpigmented clear finish or can contain convention pigments and be used as a colored finish. The composition is useful for refinishing trucks and automobiles and as an original finish for trucks, automobiles, boats, outdoor equipment and the like since the resulting finish is glossy, durable and weatherable.

19 Claims, No Drawings

ACRYLIC POLYURETHANE COATING COMPOSITION

BACKGROUND OF THE INVENTION

This invention is directed to a polyurethane coating composition and in particular to an improved acrylic polyurethane coating composition.

Acrylic polyurethane coating compositions are well known and have been widely used to finish and repair finishes on automobiles and trucks. One particular high quality acrylic polyurethane coating composition described in Vasta U.S. Pat. No. 3,558,564 issued Jan. 26, 1971 has been widely used for finishing, refinishing and repairing automobiles and trucks. Another high quality polyurethane finish containing metallic flake pigments that provides excellent glamour and a high quality appearance and is used to finish automobiles and trucks is described in Crawley et al. U.S. Pat. No. 4,131,571 issued Dec. 26, 1978. There is a need for compositions with improved durability and weatherability which is provided by this invention.

SUMMARY OF THE INVENTION

The coating composition has a binder solids content of 5–75% by weight and contains 95–25% by weight of an organic liquid; the solids consist essentially of about (1) 50–95% by weight of an acrylic polymer having a backbone of polymerized monomers of the group of styrene, alkyl methacrylate, alkyl acrylate or mixtures thereof, each having 1–12 carbon atoms in the alkyl groups and having polymerized ethylenically unsaturated ester units that form ester groups pending from the carbon atoms of the backbone that comprise about 10 to 75% of the total weight of the polymer and are of ester group (A)

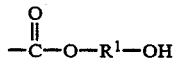

and ester group (B) which is either

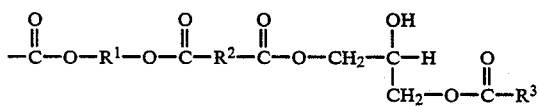

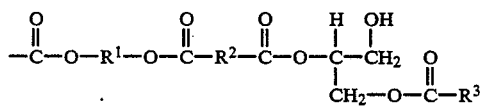

or a mixture of these groups; wherein the molar ratio of ester group (A) to ester group (B) is from about 1:1.5 to 1:2.5; and wherein $R^1$ is a saturated hydrocarbon radical having 2–4 carbon atoms, $R^2$ is an aromatic radical, $R^3$ is a tertiary hydrocarbon group having 8–10 carbon atoms; and (2) 5–50% by weight of a polyisocyanate of the formula

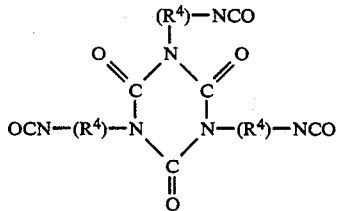

where $R^4$ is a hydrocarbon group having 6 atoms.

DESCRIPTION OF THE INVENTION

The composition contains about 5–75% by weight of binder solids and about 95–25% by weight of an organic liquid. The binder solids of the composition are of about 50–95% by weight of an acrylic polymer and 5–50% by weight of a polyisocyanate.

The acrylic polymer and the preparation thereof is disclosed in aforementioned Vasta patent which is hereby incorporated by reference into this application. Preferably, styrene and methylmethacrylate are used in the backbone. One particularly useful acrylic polymer which forms a high quality finish is a polymer of styrene/methyl methacrylate/hydroxy ethyl acrylate/phthalic anhydride/a mixed glycidyl ester of synthetic tertiary carboxylic acids of the formula

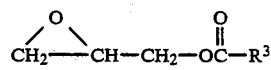

where $R^3$ is a tertiary aliphatic hydrocarbon of 8–10 carbon atoms; wherein the acrylic polymer has the aforementioned pendent ester groups (A) and (B) in the above molar ratio.

The polyisocyanate used in the composition has the formula

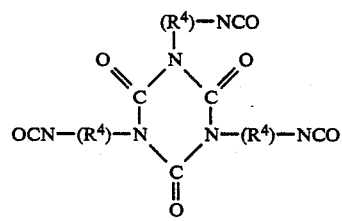

where $R^4$ is a hydrocarbon group having 6 carbon atoms. The above polyisocyanate is 1,3,5-tris(6-isocyanatohexyl)1,3,5-triazine 2,4,6(1H,3H,5H)trione. Commercially available polyisocyanate compositions contain the above polyisocyanate and small amounts of higher molecular weight moieties such as dimers, trimers, and hexamers of the above polyisocyanate.

The composition can be used as a clear coat which is unpigmented or contains relatively small amounts of pigment having the same refractive index as the resulting finish such as silica. These clear coats are generally used over a base coat. Usually the clear coat is applied over the base coat while the base coat is still wet and then both coats are cured.

The composition can be pigmented in a pigment to binder weight ratio of about 0.1/100 to 100/100. Conventional pigments can be used in the composition such as metallic oxides, preferably titanium dioxide, zinc oxide, iron oxide, and the like, metallic powders, metallic hydroxides, phthalocyanine pigments such as copper phthalocyanine blue or green, quinacridones, sulfates, carbonates, carbon blacks, silica, and other pigments, organic dyes, lakes, and the like.

Metallic flake pigments used in the composition are any of those pigments that provide a finish with metallic glamour. These pigments include any of the conventional metallic flake pigments, such as aluminum flake, nickel flake, nickel-chrome flake, but also includes "Fire Frost" flake which is a polyester flake coated with a layer of vapor-deposited aluminum and "Afflair" pigments which are mica flakes coated with titanium dioxide.

Generally, when metallic flake pigments are used in the composition, about 1-15% by weight, based on the weight of the binder, of cellulose acetate butyrate in addition to the above binder constituents is used. The cellulose acetate butyrate used in the composition has a butyryl content of about 50-60% by weight, a hydroxyl content of 1.0-3.0% by weight and has a viscosity of about 0.02-5.0 seconds measured at 25° C. according to ASTM D-1343-56. One preferred cellulose acetate butyrate that forms a high glamour finish has a butyryl content of 53-55% by weight and a viscosity of about 0.1-0.5 seconds and a hydroxyl content of 1.5-2.5% by weight.

The binder also can contain in addition about 0.05-1.0% by weight, based on the weight of the binder of an alkyl acid phosphate having 1-12 carbon atoms in the alkyl group. Typical alkyl acid phosphates are monoalkyl acid phosphates or mixtures thereof and have an acid No. of about 4-250 and are as follows:
  methyl acid phosphate
  ethyl acid phosphate
  propyl acid phosphate
  isopropyl acid phosphate
  pentyl acid phosphate
  hexyl acid phosphate
  2-ethylhexyl acid phosphate
  octyl acid phosphate
  nonyl acid phosphate
  decyl acid phosphate and
  lauryl acid phosphate.

Butyl acid phosphate is one preferred compound that provides a proper curing composition. One technique for preparing this butyl phosphate is to react phosphorus pentoxide with butanol giving a product that has an acid number of about 100-150.

The coating composition can contain in addition to the above components about 0.5-5% by weight, based on the weight of the binder, of ultraviolet light stabilizers. Preferably a blend of a benzotriazole and a hindered amine light stabilizer.

Typical ultraviolet light stabilizers that are useful in the additive are as follows:

Benzophenones such as hydroxydodecycl benzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxypheny-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-$\beta$-(3,5-di-t-butyl-4-hydroxyphenyl)propionate, $\alpha,\alpha'$-bis(2-hydroxyphenyl)-diisopropylbenzene, 3,5'-dibromo-2'-hydroxyacetophenone, ester derivatives of 4,4-bis(4'-hydroxyphenyl)pentanoic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-naphthalimides, $\alpha$-cyano-$\beta,\beta$-diphenylacrylic acid derivatives, bis(2-benzoxazolyl)alkanes, bis(2-naphthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl- or alkyl-substituted acrylonitriles, 3-methyl-5-isopropylphenyl-6-hydroxycoumarone.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[phenyldithiocarbamato]-Ni(II), and others listed in the above patent, column 8, line 44 through line 55.

The following ultraviolet light stabilizers are particularly preferred: bis(1,2,2,6,6-pentamethyl-4-piperidinyl)decane dioate a blend of 2-[2'-hydroxy-3',5'-1(1-1-dimethyl-propyl)phenyl]benzotriazole and bis-[4-(1,2,2,6,6-pentamethylpiperidyl)]2-butyl-2-[(3,5-t-butyl-4-hydroxyphenyl)methyl]-propanedioate. The stabilizers can be used in any ratio however, a 1:1 ratio of benzotriazole to propanedioate is preferred.

The coating composition can contain in addition to the above components about 0.01-0.10% by weight, based on the weight of the binder, of an organo metal catalyst. Typical organo metal catalyst are stannous dioctoate and alkyl metal laurates, such as alkyl tin laurate, alkyl cobalt laurate, alkyl manganese laurate, alkyl zirconium laurate, alkyl nickel laurate. The alkyl group can have from 1-12 carbon atoms. Particularly useful catalysts are dibutyl tin dilaurate and stannous dioctoate.

The coating composition also can contain in addition to the above components about 0.05-2% by weight, based on the weight of the binder, of poly 2-ethylhexyl acrylate. Another component that can be used in the coating composition is about 0.05-2% by weight, based on the weight of the binder, of polydimethyl siloxane.

Both of these compounds are used to reduce surface imperfections in the dried and cured paint film.

Any of the conventional solvents can be used in the composition, such as toluene, xylene, butyl acetate, acetone, methyl isobutyl ketone, methyl ethyl ketone, and other aliphatic, cycloaliphatic and aromatic hydrocarbons, esters, ethers, ketones, and the like. These solvents also can be used to reduce the composition to an application viscosity.

The coating composition is applied by conventional techniques such as brushing, spraying, dipping, flow coating and the like, and either dried at ambient temperatures or a elevated temperatures of 50°–100° C. for 2–30 minutes. The resulting acrylic coating layer is about 0.1–5 mils thick. Usually about a 1–3 mil thick layer is applied.

The composition can be applied over a wide variety of substrates such as metal, wood, glass, plastics, primed metals, or previous coated or painted metals. If used to repair an existing finish, the composition is usually applied over an acrylic primer surfacer. The composition can be applied directly to an acrylic lacquer or enamel finish that has been sanded and cleaned with an aliphatic hydrocarbon solvent. The composition can be applied as an original finish over an epoxy primer or other conventional primers or can be applied directly to bare metal. It is preferred to have the metal surface treated with a phosphate.

The following Examples illustrate the invention. The parts and percentages are by weight unless otherwise specified.

EXAMPLE 1

An acrylic resin solution was prepared following the teachings of Example 1 of the aforementioned Vasta patent. The resulting acrylic resin solution has a 55% polymer solids content in a solvent blend of 89% ethylene glycol monoethyl ether acetate, 11% VM and P naphtha of an acrylic polymer of styrene/methyl methacrylate/hydroxyethyl acrylate/"Cardura" E ester/phthalic anhydride in a weight ratio of 30/15/16.5/25/13.5 "Cardura" E ester (a mixed ester described in U.S. Pat. No. 3,275,583, issued Sept. 27, 1966, and is a glycidyl ester of a synthetic tertiary carboxylic acid of the formula

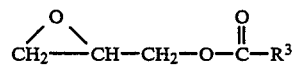

where $R^3$ is a tertiary aliphatic hydrocarbon group of 8–10 carbon atoms).

Acrylic polymer solution 1 was prepared by blending the following constituents:

|  | Parts by Weight |
|---|---|
| Acrylic resin solution (prepared above) | 56.24 |
| Ethylene glycol monoethyl ether acetate | 21.50 |
| Toluene | 5.42 |
| Ethyl acetate | 13.46 |
| Bis-[4-(1,2,2,6,6-pentamethyl piperidyl)]-2-butyl-2-[(3,5-t-butyl-4-hydroxyphenyl) methyl]-propanedioate | 0.31 |
| 2-[2'-hydroxy-3',5'-1)1-1-dimethyl propyl)phenyl]benzotriazole | 0.31 |
| Dibutyltindilaurate solution (0.2%) | 1.83 |

|  | Parts by Weight |
|---|---|
| solids in ethyl acetate) |  |
| "Modaflow" solution (10% solids of poly 2-ethylhexyl acrylate) | 0.31 |
| Polydimethy siloxane solution (5% solids in xylene) | 0.62 |
| Total | 100.00 |

A polyisocyanate solution was prepared by blending together the following constituents:

|  | Parts by Weight |
|---|---|
| "Desmodur" N3390(polyisocyanate having the structure described previously and is 1,3,5-tris(6-isocyanatohexyl)1,3,5-triazine 2,4,6(1H, 3H, 5H trione and small amounts of higher molecular weight moieties) | 42.4 |
| Ethyl acetate | 57.6 |
| Total | 100.0 |

Clear paint 1 was formulated by blending the following:

|  | Parts by Weight |
|---|---|
| Acrylic polymer solution 1 (prepared above) | 80.2 |
| Polyisocyanate solution 1 (prepared above) | 19.8 |
| Total | 100.0 |

The above clear paint 1 was sprayed on a steel panel coated with a pigmented acrylic lacquer base coat. The resulting coated panel was dried at ambient temperatures. The resulting coating had an outstanding appearance, excellent gloss measured at 20° and 60° and excellent distinctness of image. Flexibility, adhesion, chip resistance, recoat properties, chemical resistance, humidity resistance and durability were measured and were at a level acceptable for commercial clear paint.

Acrylic polymer solution 2 was prepared by blending the following constituents:

|  | Parts by Weight |
|---|---|
| Acrylic resin solution(prepared above) | 48.75 |
| Ethylene glycol monoethyl ether acetate | 21.52 |
| Toluene | 5.42 |
| Ethyl acetate | 13.48 |
| Xylene | 7.89 |
| Bis-[4-(1,2,2,6,6-pentamethyl piperidyl)]-2-butyl-2-[(3,5-t-butyl-4-hydroxyphenyl) methyl]-propanedioate | 0.27 |
| 2-[2'-hydroxy-3',5'-1(1-1-dimethyl-propyl)phenyl]benzotriazole | 0.27 |
| Dibutyltindilaurate solution (0.2% solids in ethyl acetate) | 1.59 |
| "Modaflow" solution (described above) | 0.27 |
| Polymethyl siloxane solution (described above) | 0.54 |
| Total | 100.00 |

A polyisocyanate solution 2 was prepared by blending the following constituents:

|  | Parts by Weight |
|---|---|
| "Desmodur" N 3390 (described above) | 64.7 |
| Ethyl acetate | 35.3 |
| Total | 100.0 |

Clear paint 2 was formulated by blending the following constituents:

|  | Parts by Weight |
|---|---|
| Acrylic polymer solution 2 (prepared above) | 88.3 |
| Polyisocyanate solution 2 (prepared above) | 11.7 |
| Total | 100.0 |

The above clear paint 2 was sprayed on a steel panel coated with a pigmented acrylic enamel base coat. The resulting coated panel was dried at ambient temperatures. The resulting coating had an outstanding appearance, excellent gloss measured at 20° and 60°, excellent distinctness of image. Flexibility, adhesion, chip resistance, recoat properties, chemical resistance, humidity resistance and durability were measured and were at a level acceptable for a commercial clear paint.

A white pigmented acrylic polymer composition was prepared as follows:

|  | Parts by Weight |
|---|---|
| Portion 1 | |
| Acrylic polymer solution (prepared above) | 8.80 |
| Titanium dioxide pigment | 26.40 |
| Ethylene glycol monoether ether acetate | 8.76 |
| Fumed silica | 0.04 |
| Portion II | |
| Acrylic polymer solution (prepared above) | 41.10 |
| "Modaflow" solution (described above) | 0.25 |
| Polymethyl siloxane solution (described above) | 0.50 |
| Ethyl acetate | 12.60 |
| Dibutyltindilaurate solution (described above) | 1.55 |
| Total | 100.00 |

Portion 1 is premixed and charged into a conventional sand mill and ground to fineness of 0.1 microns. Portion 2 is premixed and then portion 1 is added to portion 2 with mixing to form a white pigmented composition.

Polyisocyanate solution 3 was formulated by blending the following constituents:

|  | Parts by Weight |
|---|---|
| "Desmodur" N 3390 (described above) | 82.6 |
| Butyl acetate | 8.7 |
| "Solvesso" 100 (hydrocarbon solvent) | 8.7 |
| Total | 100.0 |

A white paint was prepared by thoroughly blending the following:

|  | Parts by Weight |
|---|---|
| White pigmented acrylic polymer composition (prepared above) | 89.8 |
| Polyisocyanate solution 3 | 10.2 |
| Total | 100.0 |

The white paint was reduced to a spray viscosity with conventional solvents and sprayed onto steel panels primed with a pigmented alkyd resin primer and dried at ambient temperatures. The resulting coating was about 2-3 mils thick. The resulting coating had an outstanding appearance, excellent gloss and distinctness of image and commercially acceptable chip resistance, humidity resistance, chemical resistance and durability.

A second white paint was formulated using the indentical ingredients as above except the biuret of hexamethylene diisocyanate was substituted for the "Desmodur" N 3390 and the resulting paint was reduced to a spray viscosity and applied to steel panels having the same alkyd resin primer as above. The resulting coating was dried at ambient temperatures and the dried coating was about 2-3 mils in thickness.

The panels coated with the white paint and panels coated with the second white paint were exposed to weathering in Florida and the % gloss retain at 20° was measured. The results are as follows:

|  | % Gloss Retain (measured at 20°) | | |
|---|---|---|---|
|  | 6 months Exposure | 12 months Exposure | 18 months Exposure |
| White Paint (invention) | 93 | 85 | 42 |
| Second White Paint (prior art) | 92 | 70 | 22 |

The panels prepared with white paint of this invention retained substantially higher percent of gloss on weathering in Florida in comparison to the second white paint which is representative of the art.

We claim:

1. A coating composition having a binder solids content of 5-75% by weight and 95-25% by weight of an organic liquid; wherein the binder consists essentially of about
   (1) 50-95% by weight, based on the weight of the binder, of an acrylic polymer having a backbone of polymerized monomers selected from the group consisting of alkyl methacrylate, alkyl acrylate each having 1-12 carbon atoms in the alkyl group, styrene or mixtures thereof and having polymerized ethylenically unsaturated ester monomers that form ester groups A and B pending from the carbon atoms of the polymer backbone and comprise about 10 to 75% of the total weight of the acrylic polymer and the ester groups consisting essentially of ester group (A)

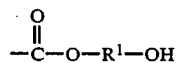

and ester group (B) selected from the group consisting of

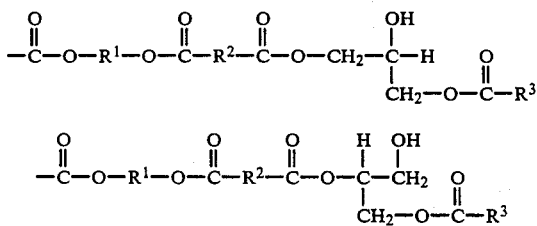

or mixtures thereof, wherein the molar ratio of ester group (A) to ester (B) is from about 1:1.5 to 1:2.5; and wherein $R^1$ is a saturated hydrocarbon group having 2–4 carbon atoms, $R^2$ is phenylene, $R^3$ is a tertiary hydrocarbon group having 8 through 10 carbon atoms; and (2) 5–50% by weight, based on the weight of the binder, of a polyisocyanate consisting of a polyisocyanate of the formula

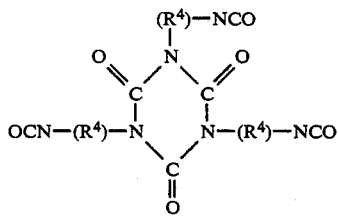

where $R^4$ is a hexylene group.

2. The coating composition of claim 1 containing in addition about 0.05–1.0% by weight, based on the weight of the binder, of an alkyl acid phosphate.

3. The coating composition of claim 2 in which the alkyl acid phosphate is butyl acid phosphate.

4. The coating composition of claim 1 containing in addition about 0.01–0.10% by weight, based on the weight of the binder, of an organo metal catalyst.

5. The coating composition of claim 4 in which the catalyst is dibutyltin dilaurate.

6. The coating composition of claim 1 containing in addition about 0.5–5% by weight, based on the weight of the binder, of ultraviolet light stabilizer.

7. The coating composition of claim 6 in which the ultraviolet light stabilizer is a blend of a benzotriazole and a hindered amine light stabilizer.

8. The coating composition of claim 1 containing in addition pigment in a pigment to binder ratio of about 0.1/100 to 100/100.

9. The coating composition of claim 8 in which the pigment contains metallic flake pigments.

10. The coating composition of claim 9 containing in addition 1–15% by weight, based on the weight of the binder, of cellulose acetate butyrate having a butyryl content of about 50–60% by weight, a hydroxyl content of about 1.0–3.0% by weight, and a viscosity of 0.02–5.0 seconds measured at 25° C. according to ASTM D-1343-56.

11. The coating composition of claim 10 containing in addition about 0.05–1.0% by weight, based on the weight of the binder, of an alkyl acid phosphate, 0.5–5% by weight, based on the weight of the binder, of a blend of ultraviolet light stabilizer of a benzotriazole and a hindered amine light stabilizer and 0.01–0.10% by weight, based on the weight of the binder, of an alkyl tin laurate catalyst.

12. The coating composition of claim 1 wherein
(1) the acrylic polymer has a backbone of styrene and methyl methacrylate and ester group A is from hydroxy ethyl acrylate and ester group B is from hydroxy ethyl acrylate, phthalic anhydrides and a mixed glycidyl ester of a tertiary carboxylic acid and wherein $R^1$ is $(CH_2)_2$, $R^2$ is phenylene $R^3$ is a tertiary hydrocarbon group having 8 through 10 carbon atoms; and
(2) the polyisocyanate is 1,3,5-tris(6-isocyanatohexyl)1,3,5-triazine 2,4,6(1H,3H,5H)trione, and contains in addition 0.05–1.0% by weight, based on the weight of the binder, of butyl acid phosphate; and 0.01–0.10% by weight, of a dibutyl tin dilaurate catalyst.

13. The coating composition of claim 12 containing in addition 0.5–5% by weight, based on the weight of the binder, of a blend of ultraviolet light stabilizers consisting of 2-[2-hydroxy-$3^1$,$5^1$-1(1-1-dimethylpropyl)-phenyl]benzotriazole and bis-[4-(1,2,6,6-pentamethyl-piperidyl)]2-butyl-2-[(3,5,-t-butyl-4-hydroxyphenyl)methyl]propanedioate.

14. The coating composition of claim 13 containing in addition about 0,05–2% by weight, based on the weight of the binder, of polydimethyl siloxane.

15. The coating composition of claim 14 containing in addition about 0.05–2% by weight, based on the weight of the binder of poly 2-ethyl hexyl acrylate.

16. The coating composition of claim 12 containing in addition 0.5–5% by weight, based on the weight of the binder, of an ultraviolet light stabilizer consisting of bis(1,2,6,6-pentamethyl-4-piperidinyl)decane dioate.

17. The coating composition of claim 12 containing in addition pigment in a pigment to binder ratio of about 0.1/100 to 100/100.

18. A substrate coated with a layer of the composition of claim 1 containing pigment in a pigment to binder ratio of about 0.1/100 to 100/100 and having superimposed thereon a layer of a clear composition of claim 1.

19. A substrate coated with a layer of the composition of claim 1 containing pigment in a pigment to binder ratio of about 0.1/100 to 100/100 and having super imposed thereon a layer of a clear composition of claim 1 containing a blend of ultraviolet light stabilizers of a benzotriazole and a hindered amine light stabilizer.

* * * * *